Oct. 3, 1967 W. R. GLASCO 3,344,552
BAIT BUCKET
Filed Jan. 3, 1966

INVENTOR
W. R. Glasco

United States Patent Office 3,344,552
Patented Oct. 3, 1967

3,344,552
BAIT BUCKET
William R. Glasco, 4534 Linden Ave.,
Cincinnati, Ohio 45212
Filed Jan. 3, 1966, Ser. No. 518,166
1 Claim. (Cl. 43—56)

ABSTRACT OF THE DISCLOSURE

A bucket for retaining bait in a live condition, the bucket including an inner bucket member and an outer bucket member, the inner bucket member having an ice compartment for delivering melted ice water into the inner bucket member for keeping the bait alive.

---

The present invention generally relates to a live bait bucket and more particularly to a double bucket structure for receiving live minnows and retaining them in live condition for a relatively long period of time.

An object of this invention is to provide a live minnow bait bucket including an outer bucket and an inner bucket partment receiving live minnows or other bait with a perforated partion separating the compartments.

Another object of the present invention is to provide a bait bucket containing an outer bucket and an inner bucket having a pair of hinged lids to provide access to separate compartments in the inner bucket.

A further object of this invention is to provide a bait bucket including an inner bucket having a small ice compartment formed therein with a separate closure lid therefor together with a collar for engaging the periphery of the bucket.

Another object of the present invention is to provide a bait bucket for effectively maintaining the bait alive for long periods of time and which is simple in construction, easy to use, long lasting and durable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
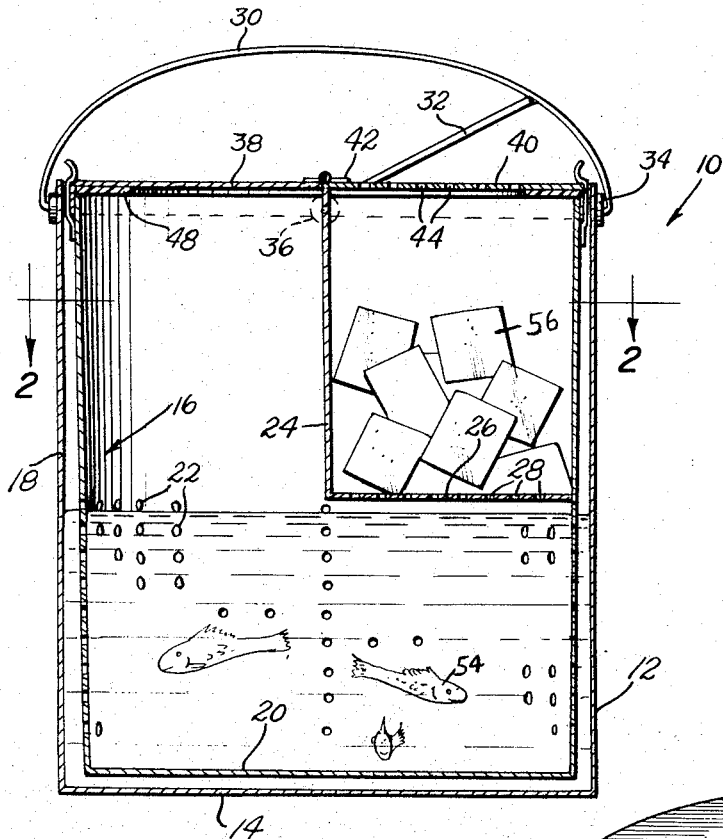
FIGURE 1 is a vertical sectional view of the bait bucket illustrating the structural details thereof.
Figure 3:
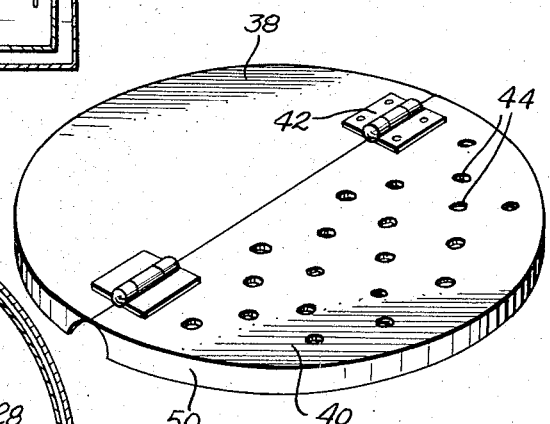
FIGURE 3 is a perspective view of the closure lid assembly for the inner bucket.
Figure 2:
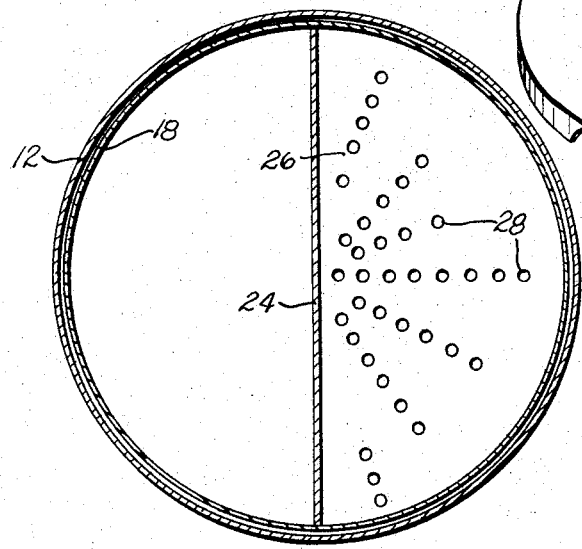
FIGURE 2 is a transverse sectional view taken along section line 2—2 on FIGURE 1.

Referring now specifically to the drawings, the numeral 10 generally designates the bait bucket which includes an outer bucket having a flat circular bottom 14 and a generally cylindrical wall 12. An inner bucket 16 which is slightly tapered is disposed in the outer bucket and includes a tapering peripheral wall 18 and a flat circular bottom 20 spaced from bottom 14. The lower portion of wall 18 is provided with holes 22 which permit circulation of water in the bait bucket.

The inner bucket 16 has a vertical centrally disposed diametric partition 24 terminating generally in the center of the inner bucket 16. A horizontal partition 26 having holes 28 therein connects with the bottom edge of partition 24 thus defining a compartment open to the top of the inner bucket 16.

The outer bucket is provided with a handle or bail 30 and a similar bail 32 is provided for the inner bucket 16. The bail 30 is pivotally supported by brackets 34 and the bail 32 is supported in the same manner by lugs or brackets 36.

A pair of semi-circular lids 38 and 40 are mounted at the upper end of the inner bucket 16 and are hingedly interconected by hinges 42. The lid 40 has a plurality of holes 44 therein for air circulation. Disposed below the lids 38 and 40 is an annular ring 48 of cork or other buoyant material and a flange 50 is provided on the lids for engagement with the peripheral wall 18. A suitable friction catch may be provided on the wall 18 for releasably retaining the lids closed.

The minnows 54 are accessible through the lid 38 and ice cubes 56 are placed on partition 26. The buckets can be made of plastic, wood or any suitable material. Also, the minnows are kept alive by the melting ice entraining oxygen into the water. The inner bucket 16 can be placed in a river, lake or the like and will not sink because of air trapped in the upper portion of the bucket under lid 38 and also due to the buoyant ring 48.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A live bait bucket comprising an outer bucket member, an inner bucket member telescoped into the said outer bucket member in a spaced relation thereto, said inner bucket member having a perforated lower portion, structure providing a separate vertically opening compartment in said inner bucket member for receiving ice, and a perforated bottom portion forming a part of said compartment spaced above said lower portion of the inner bucket whereby melting ice will drain therethrough into said inner bucket and entrain oxygen therein for keeping bait alive, said inner bucket member including a pair of hingedly interconnected lids one of said lids closing the ice compartment, the other of said lids closing the remainder of said inner bucket member, said lids having an annular flotation ring of buoyant material bounded on the bottom surface thereof to prevent sinking when the inner bucket is placed within a body of water, both of the inner and outer bucket members including a pivotal bail connected to each, the bail of the inner bucket member being relatively smaller than the bail of the outer bucket to provide unrestricted pivotal movement of each said bail relative to the other, said inner bucket tapering downwardly and terminating above the bottom of the outer bucket, the lid closing said ice compartment being perforated with openings therethrough to permit cool air circulation downwardly into said inner bucket member, and said structure providing said compartment having one wall thereof defined by a vertical diametric partition extending from the top to approximately the center of said inner bucket member.

References Cited
UNITED STATES PATENTS

| | | | |
|---|---|---|---|
| 1,419,549 | 6/1922 | Fearnow | 119—5 |
| 2,243,498 | 5/1941 | Candioto | 43—56 |
| 2,272,561 | 2/1942 | Hubbell | 43—56 |
| 2,480,759 | 8/1949 | Morreau | 43—56 |
| 2,968,887 | 1/1961 | Woolworth | 43—56 |

ALDRICH F. MEDBERY, *Primary Examiner.*

HUGH R. CHAMBLEE, *Examiner.*